United States Patent
Jeon et al.

(10) Patent No.: US 6,671,519 B2
(45) Date of Patent: Dec. 30, 2003

(54) RF BLOCK OF MOBILE COMMUNICATION BASE STATION

(75) Inventors: Jang Ho Jeon, Ichon-shi (KR); Mun Jae Byun, Sungnam-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 557 days.

(21) Appl. No.: 09/736,801

(22) Filed: Dec. 14, 2000

(65) Prior Publication Data

US 2001/0044292 A1 Nov. 22, 2001

(30) Foreign Application Priority Data

Dec. 22, 1999 (KR) .............................. 99-60432

(51) Int. Cl.$^7$ ............................................... H04B 7/00
(52) U.S. Cl. ........................................ 455/522; 455/561
(58) Field of Search ........................... 455/561, 562.1, 455/422.1, 127.2, 232.1, 234.1, 115, 127.1, 13.4, 522

(56) References Cited

U.S. PATENT DOCUMENTS 5,576,717 A * 11/1996 Searle et al. ................ 342/373
5,737,687 A   4/1998 Martin et al.
6,122,529 A * 9/2000 Sabat et al. ................. 455/561

* cited by examiner

*Primary Examiner*—Nguyen T. Vo
(74) *Attorney, Agent, or Firm*—Merchant & Gould P.C.

(57) ABSTRACT

Disclosed is a RF block of a mobile communication base station in which separated modules therein is implemented into one module, in which an antenna diagnosis function is performed by using a modem (control module) embedded therein, and in which implementation of a filter is simplified. The RF block of a mobile communication base station of the present invention has many advantages in that each of the separated modules therein is implemented into one module so that a degree of utility of a space is improved, and therefore, the number of components and a unit price is reduced, thereby curtailing a cost when configuring a system, in that a variable attenuator can vary an output level of the system so that a variable range thereof is wider than that implemented by a PCB circuit of a up-converter, and in that a control/alarm signal is processed by a modem so that it is easy to monitor the mobile communication base station upon operation thereof.

5 Claims, 2 Drawing Sheets

RF BLOCK OF MOBILE COMMUNICATION BASE STATION

BACKGROUND OF THE INVENTION

1. Field of the Invention

The present invention relates to an RF (Radio Frequency) block of a mobile communication base station, and more particularly, an RF block of a mobile communication base station in which separated modules therein is implemented into one module, in which an antenna diagnosis function is performed by using a modem (control module) embedded therein, and in which implementation of a filter is simplified.

2. Description of the Related Art

Conventionally, a typical RF block of a mobile communication base station, as shown in FIG. 1, includes a first digital unit (DU) 10 for modulating data inputted thereto by a code division multiple access (CDMA) scheme to generate the modulated data, a up-converter 20 for receiving an intermediate frequency (IF) signal from the first DU 10 to up-convert in frequency the received IF signal into an Ultra High Frequency (hereinafter, referred to as "UHF") signal, and then, to generate the up-converted signal, a first split section 30 for distributing a power level of the up-converted signal received from the UP converter 20, a high power amplifier (hereinafter, referred to as "HPA") 40 for amplifying the distributed signal received from the first split section 30 to generate the amplified signal, a transmitting (Tx) bandpass filter 50 for filtering the amplified signal received from the high power amplifier (HPA) 40 to apply the filtered signal to an antenna, a receiving (Rx) bandpass filter 60 for filtering an electrical signal received from the antenna to generate a filtered signal, and then, to generate the filtered signal, a low noise amplifier (LNA) 70 for amplifying the filtered signal received from the receiving (Rx) bandpass filter 60 to generate the amplified signal, a second split section 80 for distributing a power level of the amplified signal received from the low noise amplifier (LNA) 70, a down-converter 90 for receiving a UHF signal from the second split section 80 to down-convert in frequency the received UHF signal into an IF signal, and then, to generate the down-converted signal, and a second digital unit (DU) 100 for demodulating data inputted thereto from the down-converter 90 by a code division multiple access (CDMA) scheme to generate the demodulated data.

However, in the above-mentioned conventional RF block in the base station of a mobile communication system, there have arisen several problems in that each module is separated from each other so that many spaces is required in view of construction, that a transmitting gain controlled function is implemented limitedly to the UP converter 20 so that it is not easy to control a radius of a cell and it is also difficult to implement a diagnosis function.

SUMMARY OF THE INVENTION

Therefore, the present invention has been made in view of the above-mentioned problems, and it is an object of the present invention to provide an RF block of a mobile communication base station in which each of the separated modules therein is implemented into one module so that a degree of utility of a space is improved, and therefore, the number of components and a unit price is reduced thereby curtailing a cost when configuring a system, and in which a variable attenuator can vary an output level of the system so that a variable range thereof is wider than that implemented by a FCB circuit of a up-converter, and a control/alarm signal is processed by a modem so that it is easy to monitor the mobile communication base station upon operation thereof.

According to an aspect of the present invention, there is provided an RF block of a mobile communication base station including a up-converter adapted to receive an intermediate frequency (IF) signal to up-convert in frequency the received IF signal into a UHF signal, and then, to generate the up-converted signal, a down-converter adapted to receive the UHF signal to down-convert in frequency the received UHF signal into the IF signal, and then, to generate the down-converted signal, and a main control section adapted to perform an overall control function of the mobile communication base station, comprising:

a forward link section adapted to generate a DC power supply required for driving each unit in the mobile communication base station, and being adapted to receive the UHF signal from the up-converter to amplify the received UHF signal and then to generate the amplified UHF signal;

a first backward link section adapted to receive the UHF signal to low noise-amplify the received UHF signal for application to the down-converter;

a second backward link section adapted to receive the UHF signal to low noise-amplify the received UHF signal, and then convert the low noise-amplified signal into an IF signal for application to the down-converter, and being adapted to be supplied with a power supply to generate a signal associated with whether or not a normal operation is performed due to the supplied power supply;

a triplexer adapted to receive the UHF signal from the forward link section to filter the received signal, and then, generate the filtered signal, being adapted to be supplied with a signal received from a receiving antenna to filter the supplied signal for application to the first and second backward link sections, and being adapted to couple a power signal from a transmitting antenna with the UHF signal received from the forward link section to generate the coupled transmitting antenna power diagnosis signal;

a first directional coupler adapted to transmit an output signal from the triplexer through the transmitting antenna, while being adapted to couple the output signal from the triplexer with a signal reflected by the receiving antenna and returning therefrom to generate the coupled signal;

a second directional coupler 700 adapted to apply a signal received from the receiving antenna to the triplexer, while being adapted to couple the received signal from the receiving antenna with an output signal from the first directional coupler to generate the coupled signal;

a one-to-one switch adapted to connect the first directional coupler with the second directional coupler by a one-to-one corresponding relation, and being adapted to receive a signal outputted from the first directional coupler to generate the received signal as a signal;

a two-to-one switch adapted to connect the first directional coupler and the second directional coupler 700 with the VSWR sensor by a two-to-one corresponding relation, and being adapted to receive signals outputted from the first directional coupler and the second directional coupler to generate the received signals as a signal;

a voltage standing wave ratio ("VSWR") sensor adapted to be supplied with the signals outputted from the first directional coupler and the second directional coupler through the two-to-one switch to diagnose a status of the antenna, and then, to generate data corresponding to the diagnosis of the antenna status;

a power supply sensor adapted to sense a power supply signal inputted thereto from the triplexer to generate data corresponding to the sensing of the power supply signal, while being adapted to receive a power supply sensing control signal according to the generation of the data for application to the triplexer; and a control module adapted to supply the forward link section and the first and second backward link sections with a plurality of control signals to adjust the transmitting power level of the base station, being adapted to receive an antenna diagnosis signal from the VSWR sensor to diagnose the status of the antenna, and being adapted to receive the power supply signal from the power supply sensor to monitor the power supply of the antenna.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Now, an explanation on an RF block of a mobile communication base station according to the present invention will be in detail given hereinafter with reference to the accompanying drawings.

Figure 1:
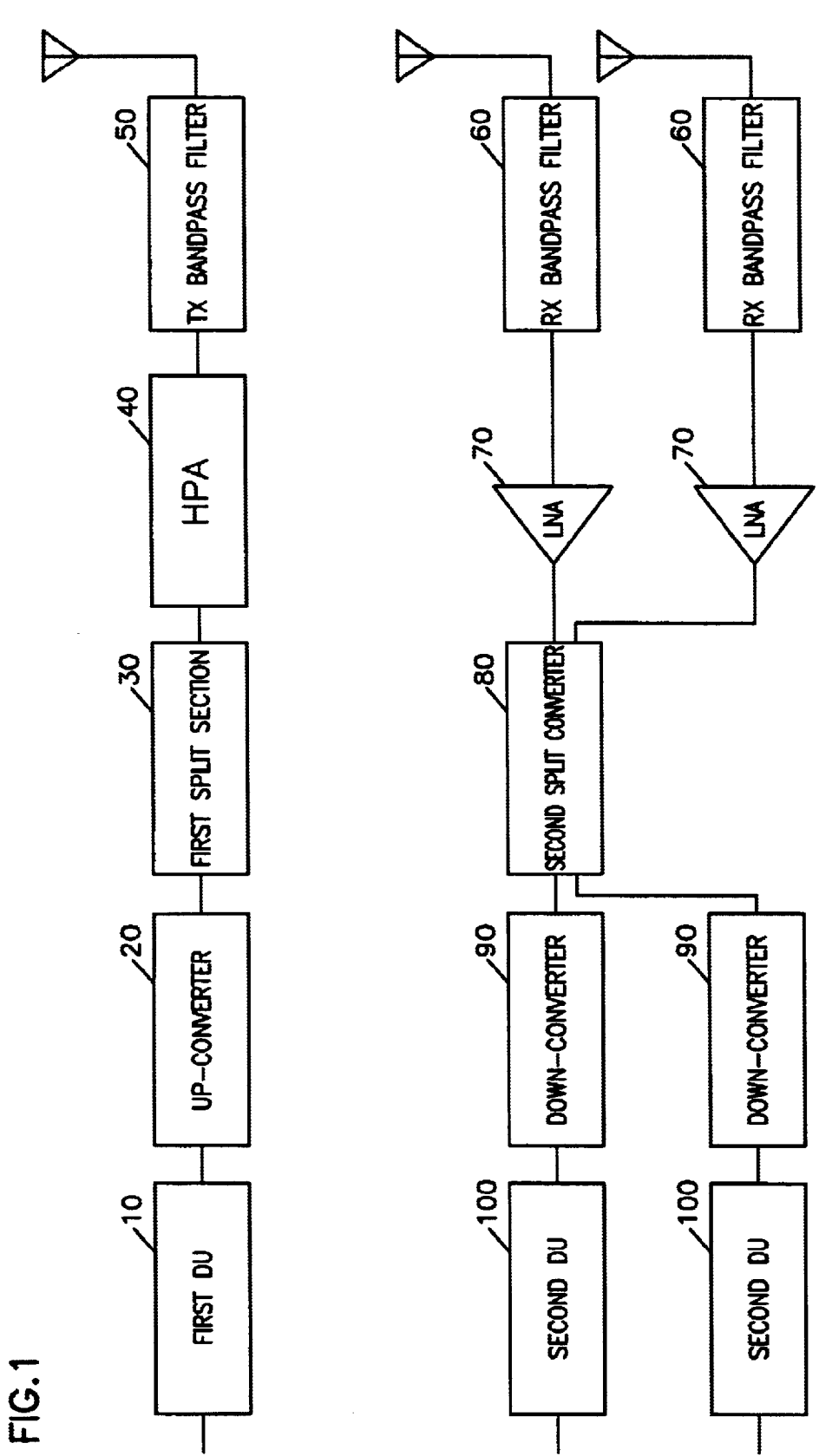
FIG. 1 is a block diagram illustrating the construction of a RF block of a mobile communication base station according to the prior art.
Figure 2:
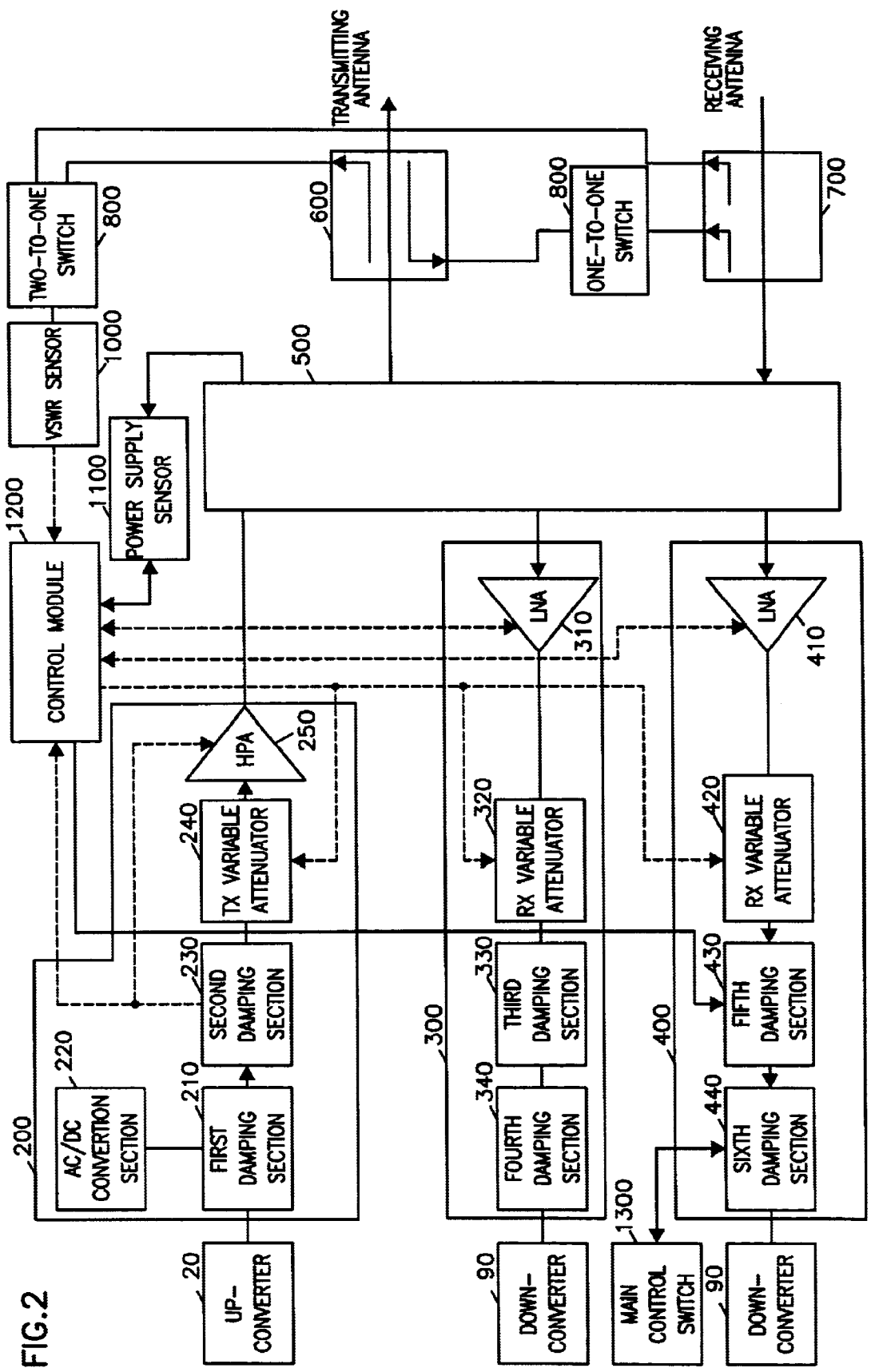
FIG. 2 is a block diagram illustrating the construction of a RF block of a mobile communication base station according to a preferred embodiment of the present invention.

FIG. 2 is a block diagram illustrating the inner construction of the RF block of the mobile communication base station according to a preferred embodiment of the present invention.

Referring to FIG. 2, there is shown an RF block of a mobile communication base station including a up-converter 20, a down-converter 90, a forward link section 200, a first backward link section 300, a second backward link section 400, a triplexer 500, a first directional coupler 600, a second directional coupler 700, an one-to-one switch 800, a two-to-one switch 900, a voltage standing wave ratio (hereinafter, referred to as "VSWR") sensor 1000, a power supply sensor 1100, a control module 1200, and a main control section 1300.

The forward link section 200 includes a first damping section 210, an AC/DC conversion section 220, a second damping section 230, a Tx variable attenuator 240, and a HPA 250, and is adapted to bias-regulate a DC power supply outputted thereto from the AC/DC conversion section 220 for application to the control module 1200 while receiving a UHF signal from the up-converter 20 to amplify the received UHF signal for application to the triplexer 500.

Also, the first damping section 210 included in the forward link section 200 receives the UHF signal from the up-converter 20 to adjust the received UHF signal into a signal with a speed of a constant level for application to the second damping section 230, while bias-regulating the DC power supply outputted thereto from the AC/DC conversion section 220 for application to the second damping section 230.

In the meantime, the AC/DC conversion section 220 included in the forward link section 200 is supplied with AC power supply from a power supply path, and then generate a stable DC power supply required for driving each functional unit for application to the first damping section.

Further, the second damping section 230 included in the forward link section 200 receives the UHF signal from the first damping section 210 to adjust the received UHF signal into a signal with a speed of a constant level for application to the Tx variable attenuator 240, while being supplied with the stable DC power supply from the first damping section 210, and then bias-regulating the supplied stable DC power supply for application to the control module 1200 and the HPA 250.

Moreover, the Tx variable attenuator 240 included in the forward link section 200 receives the UHF signal from the second damping section 230 to adjust a transmitting power level of the base station for the received UHF signal according to a control signal from the control module 1200 for application to the HPA 250.

In addition, the HPA 250 included in the forward link section 200 is supplied with the adjusted stable DC power supply from the second damping section 230 while receiving the UHF signal from the Tx variable attenuator 240 to amplify the received signal for application to the triplexer 800, and if there is generated a defect in the driving of the HPA 250 when diagnosing the driving status of the HPA 250 itself, outputs a signal according to generation of the defect to the control module 1200.

Meanwhile, the first backward link section 300 includes an LNA 310, an Rx variable attenuator 320, a third damping section 330, and a fourth damping section 340, and is adapted to receive the UHF signal from the triplexer 50 to low noise-amplify the received signal for application to the down-converter 90, and, for this operation, is adapted to be supplied with a power supply and a control signal from the control module 1200.

Also, the LNA 310 included in the first backward link section 300 is supplied with a power supply from the control module 1200 to output a response signal for a driving thereof according to the supplied power supply to the control module 1200, while receiving the UHF signal from the triplexer 50 to low noise-amplify the received signal for application to the Rx variable attenuator 320.

The Rx variable attenuator 320 included in the first backward link section 300 receives the UHF signal from the LNA 310 to constantly adjust a receiving power level of the base station for the received UHF signal according to a control signal from the control module 1200 for application to the third damping section 330.

Further, the third damping section 330 included in the first backward link section 300 receives the UHF signal from the Rx variable attenuator 320 to adjust an output amount of data to be a constant level for application to the fourth damping section 340.

The fourth damping section 340 included in the first backward link section 300 receives the UHF signal from the third damping section 330 to adjust the received signal to have a speed of a constant level for application to the down-converter 90.

In the meantime, the second backward link section 400 includes an LNA 410, an Rx variable attenuator 420, a fifth damping section 430, and a sixth damping section 440, and is adapted to receive the UHF signal from the triplexer 50 to low noise-amplify the received signal for application to the down-converter 90, and, for this operation, is adapted to be supplied with a power supply and a control signal from the control module 1200. Also, the second backward link section 400 receives a diagnosis alarm signal from the control module 1200 to apply the received diagnosis alarm signal to the main control section 1300, while receiving a control signal from the main control section 1300 for application to the control module 1200.

Also, the LNA 410 included in the second backward link section 400 is supplied with a power supply from the control module 1200 to output a response signal for a driving thereof according to the supplied power supply to the control module 1200, while receiving the UHF signal from the triplexer 50 to low noise-amplify the received signal for application to the Rx variable attenuator 320.

The Rx variable attenuator 420 included in the second backward link section 400 receives the UHF signal from the LNA 410 to constantly adjust a receiving power level of the base station for the received UHF signal according to a control signal from the control module 1200 for application to the fifth damping section 430.

Further, the fifth damping section 430 included in the second backward link section 400 receives the UHF signal from the Rx variable attenuator 420 to adjust an output amount of data to be a constant level for application to the sixth damping section 440, and receives various alarm signals from the control module 1200 for application to the sixth damping section 440, while receiving a control signal from the sixth damping section 440 for application to the control module 200.

The sixth damping section 440 included in the second backward link section 400 receives the UHF signal from the fifth damping section 430 to adjust the received signal to have a speed of a constant level for application to the down-converter 90, and receives diverse alarm signals from the fifth damping section 430 for application to the main control section 1300, while receiving a control signal from the main control section 1300 for application to the fifth damping section 430.

Here, the fifth damping section 430 and the sixth damping section 440 includes a function of a diplexer to transmit UHF data toward the base station and output the control signal toward the RF block.

In the meantime, the triplexer 500 is adapted to receive the UHF signal from the forward link section 200 to filter the received signal, and then, generate the filtered signal, and is adapted to be supplied with a signal received from a receiving antenna through the second directional coupler 700 to filter the supplied signal for application to the first and second backward link sections 300 and 400. Also, the triplexer 500 is adapted to couple a power signal from a transmitting antenna with the UHF signal received from the forward link section 200 to apply the coupled transmitting antenna power diagnosis signal to the power supply sensor 1100.

In addition, the first directional coupler 600 is adapted to transmit an output signal from the triplexer 500 through the transmitting antenna, while being adapted to couple the output signal from the triplexer 500 with a signal reflected by the receiving antenna and returning therefrom for application to the two-to-one switch 900.

The second directional coupler 700 is adapted to apply a signal received from the receiving antenna to the triplexer 500, while being adapted to couple the signal inputted thereto from the receiving antenna with a signal inputted thereto from the one-to-one switch 800 for application to the two-to-one switch 900.

Further, the one-to-one switch 800 is adapted to connect the first directional coupler 600 with the second directional coupler 700 by a one-to-one corresponding relation, and is adapted to receive a signal from the first directional coupler 600 to apply the received signal as a signal to the second directional coupler 700.

In the meantime, the two-to-one switch 900 is adapted to connect the first directional coupler 600 and the second directional coupler 700 with the VSWR sensor 1000 by a two-to-one corresponding relation, and is adapted to receive signals outputted from the first directional coupler 600 and the second directional coupler 700 to apply the received signals as a signal to the VSWR sensor 1000.

The VSWR sensor 1000 is adapted to be supplied with the signals outputted from the first directional coupler 600 and the second directional coupler 700 through the two-to-one switch 900 to diagnose a status of the antenna, and then, to apply data corresponding to the diagnosis of the antenna status to the control module 1200.

Also, the power supply sensor 1100 is adapted to sense a power supply signal inputted thereto from the triplexer 500 to apply data corresponding to the sensing of the power supply signal to the control module 1200, while being adapted to receive a power supply sensing control signal from the control module 1200 for application to the triplexer 500.

The control module 1200 is adapted to supply the Tx variable attenuator 240 with the control signal to adjust the transmitting power level of the base station, is adapted to receive an antenna diagnosis signal from the VSWR sensor 1000 to diagnose the status of the antenna, and is adapted to receive the power supply signal from the power supply sensor 1100 to monitor the power supply of the antenna.

Besides, the main control section 1300 is adapted to receive various diagnosis signals from the sixth damping section 440 of the second backward link section 400 to apply the control signal associated with the diagnosis to the sixth damping section 440, thereby performing an overall control operation of the communication system and the base station.

Now, an explanation on the operation of the mobile communication base station implemented by the present invention will be in detail given hereinafter with reference to FIG. 2.

First, the transmitting operation of a RF signal will be described hereinafter.

The up-converter 20 up-converts in frequency a received IF signal into a UHF signal to apply the up-converted signal to the Tx variable attenuator 240 through the first and second damping section 210 and 230.

Then, the Tx variable attenuator 240 adjusts the transmitting power level of the signal inputted thereto through the first and second damping section 210 and 230 for application to the HPA 250 which amplifies the adjusted UHF signal to apply the amplified UHF signal to the triplexer 500.

Next, the triplexer 500 filters the UHF signal outputted thereto from the HPA 250 to apply the filtered UHF signal to the first directional coupler 600 which sends out the UHF signal through the transmitting antenna.

Meanwhile, the receiving operation of the RF signal will be described hereinafter.

First, the second directional coupler 700 is supplied with a signal received through the receiving antenna for application to the triplexer 800.

Then, the triplexer 800 receives the signal inputted thereto from the second directional coupler 700 to filter the received signal for application to the LNAs 310 and 410.

At this time, the LNAs 310 and 410 low noise-amplify the filtered UHF signal inputted thereto from the triplexer 800 for application to the down-converter 90 through the third, fourth, fifth, and sixth damping sections 330, 340, 430, and 440.

Then, the down-converter 90 down-converts in frequency the UHF signal inputted thereto from the LNAs 310 and 410 into an IF signal.

Also, the operation of the Tx/Rx variable attenuators 240, 320, and 420 will be described hereinafter.

First, the main control section 1300 supplies transmitting/receiving power control values to the control module 1200 through the fifth and sixth damping sections 430 and 440.

Then, the control module 1200 applies a control signal according to the transmitting/receiving power control values inputted thereto from the main control section 1300 to the Tx/Rx variable attenuators 240, 320, and 420 to control the operation of the constitutional elements.

In the meantime, the ON/OFF control operation of the HPA 250 of the forward link section 200 will be described hereinafter.

First, the main control section 1300 applies ON/OFF control values to the control module 1200 through the fifth and sixth damping sections 430 and 440.

Then, the control module 1200 applies a control signal according to the ON/OFF control values to the HPA 250 to turn the HPA 250 ON/OFF.

In addition, the diagnosis operation of the HPA 250 of the forward link section 200 will be described hereinafter.

First, if there is generated a defect in the driving of the HPA when diagnosing the driving status of the HPA itself, the HPA 250 generates an alarm signal according to generation of the defect for application to the control module 1200.

Then, the control module 1200 receives the alarm signal from the HPA 250 to apply the received alarm signal to the main control section 1300 through the fifth and sixth damping sections 430 and 440 so that an alarm message can be recognized.

Meanwhile, the diagnosis operations of the LNAs 310 and 410 of the forward link section 200 will be described hereinafter.

First, if there is generated a defect in the driving of the LNAs 310 and 410 when diagnosing the driving status of the LNAs themselves, the LNAs 310 and 410 generate an alarm signal according to generation of the defect for application to the control module 1200.

Then, the control module 1200 receives the alarm signal from the LNAs 310 and 410 to apply the received alarm signal to the main control section 1300 through the fifth and sixth damping sections 430 and 440 so that an alarm message can be recognized.

Also, the power sensing operation will be described hereinafter.

The main control section 1300 applies a power supply sensing command signal to the control module 1200 through the fifth and sixth damping sections 430 and 440.

Then, the control module 1200 reads out a power sensing signal from the power supply sensor 1100 to apply the readout power supply sensing signal to the main control section 1300 through the fifth and sixth damping sections 430 and 440.

Meanwhile, the diagnosis operation of the transmitting antenna will be described hereinafter.

First, the first directional coupler 600 couples the UHF signal outputted from the triplexer 500 with the signal reflected by the receiving antenna and returning therefrom for application to the two-to-one switch 900.

Then, the two-to-one switch 900 switches the output signal from the first directional coupler 600 for application to the VSWR sensor 1000.

Next, the control module 1200 receives the switched signal from the VSWR sensor 1000 to generate the power supply sensing signal based on the received signal for application to the main control section 1300 through the fifth and sixth damping sections 430 and 440.

Further, the diagnosis operation of the receiving antenna will be described hereinafter.

First, the second directional coupler 700 couple the signal inputted thereto from the receiving antenna with the signal inputted thereto from the one-to-one switch 800 for application to the two-to-one switch 900.

Then, the two-to-one switch 900 switches the output signal from the second directional coupler 700 for application to the VSWR sensor 1000.

Next, the control module 1200 receives the switched signal from the VSWR sensor 1000 to generate the power supply sensing signal based on the received signal for application to the main control section 1300 through the fifth and sixth damping sections 430 and 440.

As can be seen from the foregoing, a RF block of a mobile communication base station of the present invention has many advantages in that each of the separated modules therein is implemented into one module so that a degree of utility of a space is improved, and therefore, the number of components and a unit price is reduced, thereby curtailing a cost when configuring a system, in that a variable attenuator can vary an output level of the system so that a variable range thereof is wider than that implemented by a PCB circuit of a up-converter, and in that a control/alarm signal is processed by a modem so that it is easy to monitor the mobile communication base station upon operation thereof.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An RF block of a mobile communication base station including a up-converter adapted to receive an intermediate frequency (IF) signal to up-convert in frequency the received IF signal into a UHF signal, and then, to generate the up-converted signal, a down-converter adapted to receive the UHF signal to down-convert in frequency the received UHF signal into the IF signal, and then, to generate the down-converted signal, and a main control section adapted to perform an overall control function of the mobile communication base station, comprising:

a forward link section adapted to generate a DC power supply required for driving each unit in the mobile is communication base station, and being adapted to receive the UHF signal from the up-converter to amplify the received UHF signal and then to generate the amplified UHF signal;

a first backward link section adapted to receive the UHF signal to low noise-amplify the received UHF signal for application to the down-converter;

a second backward link section adapted to receive the UHF signal to low noise-amplify the received UHF signal, and then convert the low noise-amplified signal into an IF signal for application to the down-converter, and being adapted to be supplied with a power supply to generate a signal associated with whether or not a normal operation is performed due to the supplied power supply;

a triplexer adapted to receive the UHF signal from the forward link section to filter the received signal, and then, generate the filtered signal, being adapted to be supplied with a signal received from a receiving antenna to filter the supplied signal for application to the first and second backward link sections, and being adapted to couple a power signal from a transmitting antenna with the UHF signal received from the forward link section to generate the coupled transmitting antenna power diagnosis signal;

a first directional coupler adapted to transmit an output signal from the triplexer through the transmitting antenna, while being adapted to couple the output signal from the triplexer with a signal reflected by the receiving antenna and returning therefrom to generate the coupled signal;

a second directional coupler 700 adapted to apply a signal received from the receiving antenna to the triplexer, while being adapted to couple the received signal from the receiving antenna with an output signal from the first directional coupler to generate the coupled signal;

a one-to-one switch adapted to connect the first directional coupler with the second directional coupler by a one-to-one corresponding relation, and being adapted to receive a signal outputted from the first directional coupler to generate the received signal as a signal;

a two-to-one switch adapted to connect the first directional coupler and the second directional coupler 700 with a VSWR sensor by a two-to-one corresponding relation, and being adapted to receive signals outputted from the first directional coupler and the second directional coupler to generate the received signals as a signal;

the voltage standing wave ratio ("VSWR") sensor adapted to be supplied with the signals outputted from the first directional coupler and the second directional coupler through the two-to-one switch to diagnose a status of the antenna, and then, to generate data corresponding to the diagnosis of the antenna status;

a power supply sensor adapted to sense a power supply signal inputted thereto from the triplexer to generate data corresponding to the sensing of the power supply signal, while being adapted to receive a power supply sensing control signal according to the generation of the data for application to the triplexer; and a control module adapted to supply the forward link section and the first and second backward link sections with a plurality of control signals to adjust the transmitting power level of the base station, being adapted to receive an antenna diagnosis signal from the VSWR sensor to diagnose the status of the antenna, and being adapted to receive the power supply signal from the power supply sensor to monitor the power supply of the antenna.

2. The RF block of the mobile communication base station according to claim 1, wherein the forward link section comprises:

a first damping section adapted to receive the UHF signal from the up-converter 20 to adjust the received UHF signal into a signal with a speed of a constant level, and then generate the adjusted signal;

an AC/DC conversion section adapted to be supplied with AC power supply from a power supply path, and then generate a stable DC power supply required for driving each functional unit for application to the first damping section;

a second damping section adapted to be supplied with the UHF signal and stable DC power supply from the first damping section to adjust the supplied UHF signal and the DC power supply into a signal with a speed of a constant level, respectively, and then to generate the adjusted UHF signal and DC power supply;

a Tx variable attenuator adapted to receive the UHF signal from the second damping section to adjust a transmitting power level of the base station for the received UHF signal under the control of the control module, and then generate the adjusted signal; and an HPA adapted to receive the UHF signal from the Tx variable attenuator to amplify the received signal for application to the triplexer, and if there is generated a defect in the driving of the HPA when diagnosing the driving status of the HPA itself, being adapted to generate an alarm signal according to generation of the defect for application to the control module.

3. The RF block of the mobile communication base station according to claim 1, wherein the first backward link section comprises:

an LNA adapted to receive the UHF signal from the triplexer to low noise-amplify the received signal, and then to generate the low noise-amplified signal while being supplied with a power supply input signal from the control module to output a response signal for a driving thereof according to the supplied power supply to the control module;

an Rx variable attenuator adapted to receive the UHF signal from the LNA to adjust a receiving power level of the base station for the received UHF signal under the control of the control module, and then generate the adjusted signal;

a third damping section adapted to receive the UHF signal from the Rx variable attenuator to adjust an output amount of data to be a constant level; and a fourth damping section adapted to receive the UHF signal from the third damping section to adjust the received signal to have a speed of a constant level for application to the down-converter.

4. The RF block of the mobile communication base station according to claim 1, wherein the first backward link section comprises:

an LNA adapted to receive the UHF signal from the triplexer to low noise-amplify the received signal, and then to generate the low noise-amplified signal while being supplied with a power supply input signal from the control module to output a response signal for a driving thereof according to the supplied power supply to the control module;

an Rx variable attenuator adapted to receive the UHF signal from the LNA to adjust a receiving power level of the base station for the received UHF signal under the control of the control module, and then generate the adjusted signal;

a fifth damping section adapted to receive the UHF signal from the Rx variable attenuator to adjust an output amount of data to be a constant level, while being adapted to receive various diagnosis information and alarm information from the control module to generate the received diagnosis and alarm information; and a sixth damping section adapted to receive the UHF signal from the fifth damping section to adjust the received signal to have a speed of a constant level for application to the down-converter, and receive diagnosis information and alarm information from the fifth damping section for application to the main control section, while being adapted to receive a control signal from the main control section for application to the fifth damping section.

5. The RF block of a mobile communication base station according to claim 4, wherein the fifth damping section and the sixth damping section include a function of a diplexer to transmit UHF data toward the base station and output the control signal toward the RF block.

* * * * *